United States Patent
Parsons et al.

(10) Patent No.: US 8,954,542 B2
(45) Date of Patent: Feb. 10, 2015

(54) METHOD AND SYSTEM FOR TRANSMITTING AND RECEIVING CONFIGURATION AND REGISTRATION INFORMATION FOR SESSION INITIATION PROTOCOL DEVICES

(75) Inventors: Shane Parsons, Napanee (CA); Shaowu Luo, Belleville (CA); Alain Coutu, Belleville (CA); John Marshall, Bellville (CA)

(73) Assignee: Avaya Inc., Basking Ridge, NJ (US)

(*) Notice: Subject to any disclaimer, the term of this patent is extended or adjusted under 35 U.S.C. 154(b) by 243 days.

(21) Appl. No.: 13/160,188

(22) Filed: Jun. 14, 2011

(65) Prior Publication Data

US 2012/0324061 A1 Dec. 20, 2012

(51) Int. Cl.
| | |
|---|---|
| G06F 15/16 | (2006.01) |
| G06F 15/177 | (2006.01) |
| H04L 29/08 | (2006.01) |
| H04L 12/24 | (2006.01) |
| H04L 29/06 | (2006.01) |
| G06F 15/173 | (2006.01) |

(52) U.S. Cl.
CPC ............ H04L 67/34 (2013.01); H04L 41/0806 (2013.01); H04L 65/1073 (2013.01); H04L 41/0213 (2013.01)
USPC ............ 709/220; 709/203; 709/206; 709/224

(58) Field of Classification Search
USPC .......................................................... 709/220
See application file for complete search history.

(56) References Cited

U.S. PATENT DOCUMENTS

| | | | | |
|---|---|---|---|---|
| 7,680,037 | B2* | 3/2010 | Cortes et al. | 370/230 |
| 7,698,543 | B2* | 4/2010 | Sarwono et al. | 713/1 |
| 7,752,315 | B2* | 7/2010 | Da Palma et al. | 709/227 |
| 7,849,205 | B2* | 12/2010 | Pounds et al. | 709/230 |
| 7,925,792 | B2* | 4/2011 | Tian | 709/248 |
| 8,055,778 | B2* | 11/2011 | Richardson et al. | 709/227 |
| 8,089,953 | B2* | 1/2012 | Angelot et al. | 370/351 |
| 8,125,999 | B2* | 2/2012 | Yasrebi et al. | 370/401 |
| 8,127,027 | B2* | 2/2012 | Niiya | 709/228 |
| 8,130,677 | B2* | 3/2012 | Barker et al. | 370/255 |
| 8,161,080 | B2* | 4/2012 | Gallant | 707/802 |
| 8,244,876 | B2* | 8/2012 | Sollee | 709/227 |
| 8,249,561 | B2* | 8/2012 | Bakker et al. | 455/414.1 |
| 8,266,420 | B2* | 9/2012 | Chakarapani et al. | 713/100 |
| 8,281,010 | B2* | 10/2012 | Ansari et al. | 709/225 |
| 8,305,992 | B2* | 11/2012 | Trossen | 370/331 |

(Continued)

OTHER PUBLICATIONS

Sollins, K. "The TFTP Protocol (Revision 2)," RFC 1350, Jul. 1992.*

(Continued)

*Primary Examiner* — Melvin H Pollack
(74) *Attorney, Agent, or Firm* — Christopher & Weisberg, P.A.

(57) ABSTRACT

A system is provided for configuring a Session Initiation Protocol (SIP) device. The system includes at least one SIP server in communication with the SIP device over an Internet Protocol (IP) network. The at least one SIP server includes a database that stores SIP device configuration data and a receiver that receives a first SIP message to initiate SIP device configuration. The at least one SIP server also includes a transmitter that transmits configuration data to the SIP device in response to receiving the first SIP message. The receiver also receives a second message from the SIP device indicating whether the SIP device was successfully configured based on the configuration data.

19 Claims, 5 Drawing Sheets

(56) References Cited

U.S. PATENT DOCUMENTS

| | | | |
|---|---|---|---|
| 8,307,200 B2* | 11/2012 | Tanizawa et al. | 713/152 |
| 8,310,918 B2* | 11/2012 | Poulson et al. | 370/228 |
| 8,320,365 B2* | 11/2012 | Weintraub et al. | 370/352 |
| 8,326,955 B2* | 12/2012 | Airo et al. | 709/222 |
| 8,345,679 B2* | 1/2013 | Allen et al. | 370/389 |
| 8,346,976 B2* | 1/2013 | Bouthemy et al. | 709/250 |
| 8,412,773 B1* | 4/2013 | Chapweske et al. | 709/205 |
| 8,467,354 B1* | 6/2013 | Jerkunica et al. | 370/338 |
| 8,489,872 B1* | 7/2013 | Kapoor | 713/100 |
| 2009/0150523 A1* | 6/2009 | Gray et al. | 709/220 |
| 2009/0216862 A1* | 8/2009 | Seeman | 709/220 |
| 2009/0234927 A1* | 9/2009 | Buzescu | 709/206 |
| 2010/0146066 A1* | 6/2010 | Bian et al. | 709/206 |
| 2010/0161745 A1* | 6/2010 | Yamazaki et al. | 709/206 |
| 2010/0299418 A1* | 11/2010 | Bhat | 709/221 |
| 2010/0312870 A1* | 12/2010 | Kennedy et al. | 709/223 |
| 2010/0329244 A1* | 12/2010 | Buckley et al. | 370/352 |
| 2011/0173674 A1* | 7/2011 | Thomson et al. | 726/1 |
| 2012/0036552 A1* | 2/2012 | Dare et al. | 726/1 |
| 2012/0089728 A1* | 4/2012 | Deruijter et al. | 709/224 |
| 2012/0182987 A1* | 7/2012 | Gallant | 370/352 |
| 2012/0185604 A1* | 7/2012 | Shatsky | 709/228 |
| 2012/0203884 A1* | 8/2012 | von Eicken et al. | 709/223 |
| 2012/0239822 A1* | 9/2012 | Poulson et al. | 709/239 |
| 2012/0263175 A1* | 10/2012 | Wang | 370/352 |
| 2012/0265849 A1* | 10/2012 | Bakker et al. | 709/217 |
| 2013/0067046 A1* | 3/2013 | Clark et al. | 709/220 |

OTHER PUBLICATIONS

Johnson, R. "TFTP Server Address Option for DHCPv4," RFC 5859, Jun. 2010.*

Iijima, T. et al. "Experience of Implementing NETCONF over SOAP," RFC 5381, Oct. 2008.*

O'Tuathail, E. and Rose, M. "Using the Simple Object Access Protocol (SOAP) in Blocks Extensible Exchange Protocol (BEEP)," RFC 4227, Jan. 2006.*

Goddard, T. "Using NETCONF over the Simple Object Accress Protocol (SOAP)," RFC 4743, Dec. 2006.*

Mule, J-F. "Requirements for SIP-Based Session Peering," RFC 6271, Jun. 2011.*

Shacham, R. et al. "Session Initiation Protocol (SIP) Session Mobility," RFC 5631, Oct. 2009.*

Lawrence, S. and Elwell, J. "Session Initiation Protocol (SIP) User Agent Configuration," RFC 6011, Oct. 2010.*

Rosenberg, J. "The Extensible Markup Language (XML) Configuration Access Protocol (XCAP)," RFC 4825, May 2007.*

Schulzrinne, H. and Volz, B. "Dynamic Host Configuration Protocol (DHCPv6) Options for Session Initiation Protocol (SIP) Servers," RFC 3319, Jul. 2003.*

* cited by examiner

METHOD AND SYSTEM FOR TRANSMITTING AND RECEIVING CONFIGURATION AND REGISTRATION INFORMATION FOR SESSION INITIATION PROTOCOL DEVICES

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to telecommunications, and in particular to a method and system for registering and configuring session initiation protocol based devices.

BACKGROUND OF THE INVENTION

IP telephony, also known as Voice over Internet Protocol (VoIP), is continuing to gain popularity due to its economic feasibility, configurability and expanding service availability. In particular, VoIP can support voice, text and image communications such that new types of services are continually being added. However, to operate properly, VoIP devices must first be configured with network and phone information before they can support VoIP communication, let alone basic telephone functionality. For example, some consumer VoIP devices may be preconfigured to log in to a specific remote server of the service provider, in which the user may be prompted to provide device information, e.g., MAC address, IP address and phone number. However, this is time consuming especially in businesses that use numerous VoIP phones that require configuration and reconfiguration. Also, entering the correct information is typically beyond a novice user's abilities.

Some VoIP devices may be programmed to connect to a Trivial File Transfer Protocol (TFTP) server before connecting using the session initiation protocol (SIP). For example, upon boot up, the VoIP device may initiate a TFTP session with a TFTP server in order to download configuration information in a proprietary text-based arrangement. In particular, the downloaded file may contain configuration information that allows the phone to function. However, the use of a TFTP server is limiting. TFTP file download may require the device to go to a Domain Name System (DNS) server, get a server instance, subscribe to configuration updates, get a configuration notification, fetch the configuration file or make a simple object access protocol (SOAP) call to get connection information. Moreover, if the TFTP server or DNS server is down, the VoIP device will not be configured. This TFTP based process involves numerous complex steps, which does not offer flexibility or redundancy.

Also, corporate end users may travel to different corporate sites in which their respective VoIP device may receive the same configuration file regardless of new VoIP device location. In particular, the device may receive full access to the corporate network or the corporate servers may have to allocate server resources for each new VoIP device even if the device will only be temporarily using the corporate network, e.g., visiting employees will go back to their home office. In other words, the VoIP device configuration does not take into account circumstances that may waste server resources, and may provide unwanted or unintended services and functionality. Any modification to the VoIP device to account for these circumstances is typically done by manually reprogramming file that is downloaded using TFTP file. As such, even after installing the TFTP file, additional VoIP device configuration may still be required such as keypad functionality programming, features and VoIP device permissions. A task that is time consuming and not easily accomplished for most novice end users.

Accordingly, there exists a need in the art for a system and method which allows SIP-based communication devices to obtain configuration information in a resilient and reliable manner.

SUMMARY OF THE INVENTION

The present invention advantageously provides a method and system for registering and configuring SIP-based communication devices in a resilient and reliable manner.

According to one embodiment, a system is provided for configuring a Session Initiation Protocol (SIP) device. The system includes at least one SIP server in communication with the SIP device over an Internet Protocol (IP) network. The at least one SIP server includes a database that stores SIP device configuration data and a receiver that receives a first SIP message to initiate SIP device configuration. The at least one SIP server also includes a transmitter that transmits configuration data to the SIP device in response to receiving the first SIP message. The receiver also receives a second message from the SIP device indicating whether the SIP device was successfully configured based on the configuration data.

According to another embodiment, a Session Initiating Protocol (SIP) device is provided that includes a transmitter that transmits a configuration request message. The configuration request message initiates an SIP session. The device also includes a receiver that receives an SIP configuration message that includes SIP device configuration data. A processor in communication with the transmitter and receiver is also included in the device. The processor processes the SIP device configuration data and initiates SIP device configuration based on the processed SIP device configuration data. Also, the processor determines whether the SIP device is successfully configured.

According to yet another embodiment, a method is provided for configuring a Session Initiation Protocol (SIP) device. The method includes storing SIP device configuration data. Also, the method includes receiving an sip device configuration message and establishing an sip session in response to the received configuration message. The method also includes transmitting SIP device configuration data to an sip device in response to establishing the SIP session.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention advantageously provides a system and method which allows SIP-based communication devices to obtain configuration information in a resilient and reliable manner. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
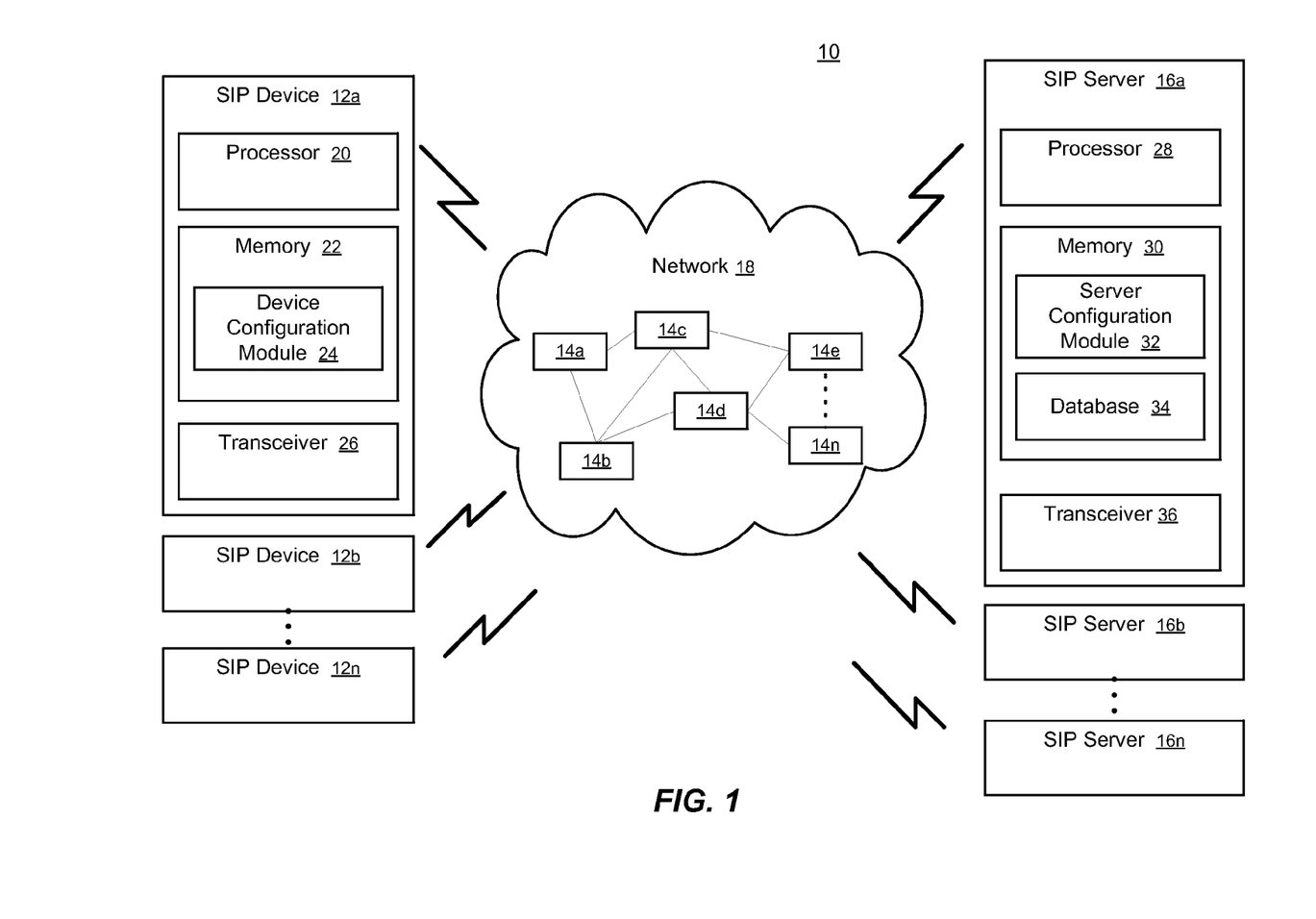
FIG. 1 is a block diagram of an sip-based communication network constructed in accordance with the principles of the present invention.

Referring now to the drawing figures in which like reference designators refer to like elements there is shown in FIG. 1 an exemplary SIP system constructed in accordance with the principles of the present invention and designated generally as "10." System 10 may include various Session Initial Protocol (SIP) elements. In particular, system 10 may include one or more SIP-based or SIP-enabled devices 12a to 12n (collectively referred to as "SIP devices 12"), one or more SIP proxy servers 14a to 14n (collectively referred to as "SIP proxy server 14") and one or more SIP servers 16a to 16n (collectively referred to as "SIP servers 16"), communicating via network 18.

SIP devices 12 may include wired or wireless devices such as mobile phones, telephones, personal digital assistant devices, computers, among other SIP enabled devices. SIP devices 12 may communicate with network 18 using IP protocols known in the art. SIP servers 16 may be configured to receive and transmit SIP messages and configuration data, as is discussed in detail below. SIP device 12 may include processor 20, memory 22 storing device configuration module 24 and transceiver 26, among other components. Processor 20 may include a central processing unit (CPU) for executing computer program instructions as is well known in the art.

In particular, memory 22 may include a non-volatile and volatile memory. For example, non-volatile memory may include a hard drive, memory stick, flash memory and the like. Also, volatile memory may include random access memory and others known in the art. In addition to storing program instructions such as those for device configuration module 24, memory 22 may store SIP device information, configuration data and other data. Device configuration module 24 includes instructions which, when executed by processor 20, cause processor 20 to perform the registration and configuration process for SIP device 12, discussed in detail with reference to FIG. 4. Transceiver 26 provides transmission and reception of communications over network 18, i.e., communication interface. For example, the transceiver module 26 may include a transmitter, a receiver and the like.

SIP server 16 may include processor 28, memory 30 storing server configuration module 32 and database 34, transceiver 36, among other components. In particular, processor 28, memory 30 and transceiver 36 may be function substantially the same as the corresponding SIP device 12 components, with size and performance being adjusted based on design needs. Memory 30 may store server configuration module 32 and database 34. Configuration module 32, when executed by processor 28, performs the registration and configuration process of SIP device 12 as discussed with respect to FIG. 5. Database 34 may store registration and configuration data for various SIP enabled devices. For example, database 34 may have registration and configuration tables as discussed in detail below. While database 34 is shown and described as part of memory 30, it is contemplated that database 34 can alternatively reside in external memory such as an external storage device (not shown).

Network 18 may be an Internet Protocol (IP) network supporting VoIP and SIP communications. Network 18 may be established as a wide area network (WAN), local area network (LAN), among other IP-based networks. In particular, network 18 may support one or more SIP proxy servers 14 that are configured, among other things, to route SIP messages throughout network 18. Network 18 may also include at least one private branch exchange (PBX), IP gateway, firewall, among other networking devices known in the art (not shown).

Figure 2:
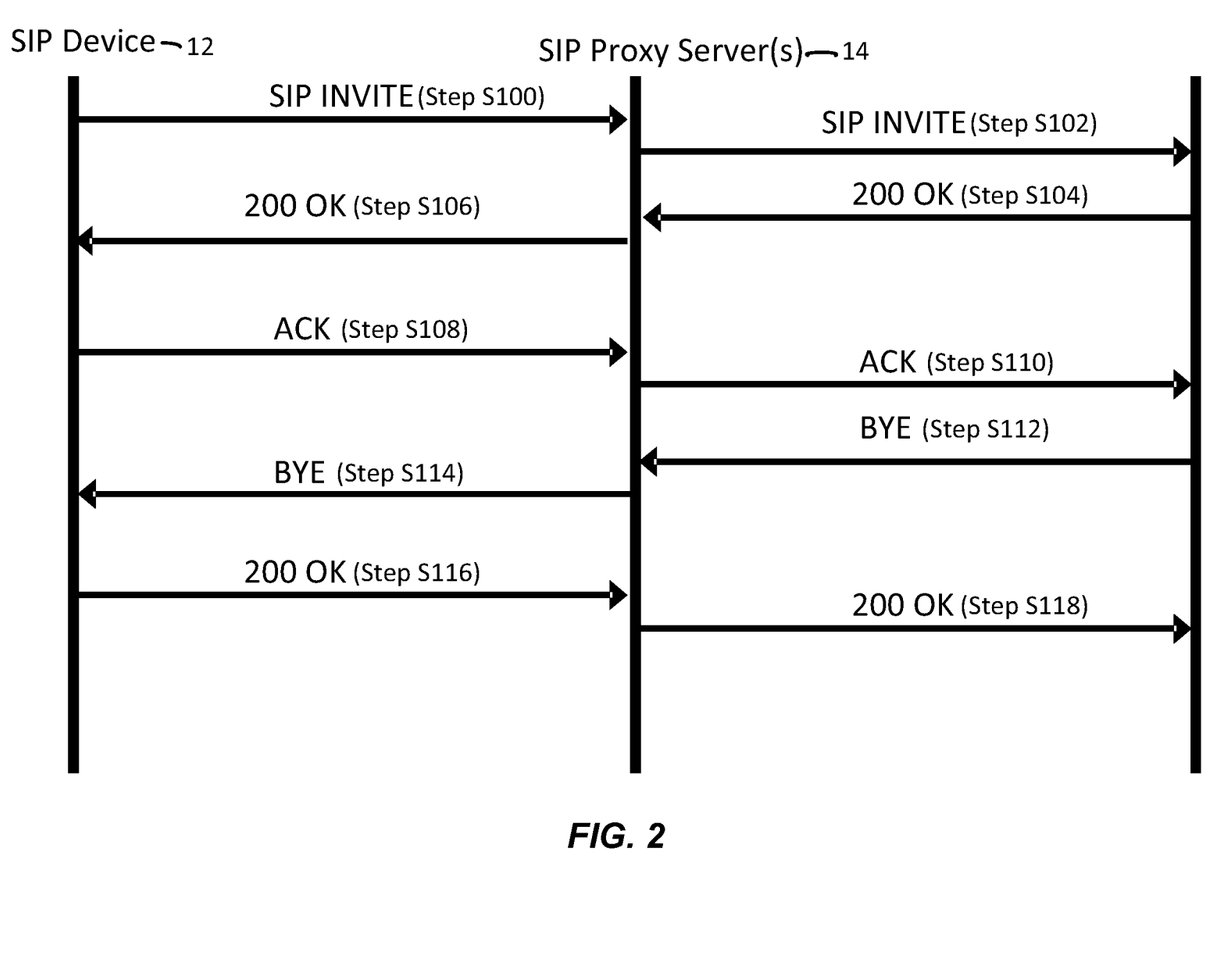
FIG. 2 is a flow chart of an exemplary SIP device registration and configuration process of the present invention.

An exemplary process for registering and configuring SIP device 12 is described with reference to FIG. 2. SIP device 12 initiates the registration and configuration process by transmitting an SIP INVITE message to SIP server 16 (Step S100). For example, the registration and configuration process may be initiated upon device power on, user input, device detection of network 18, among other initiation events. SIP INVITE message may include SIP device information, codec information, among other device information that may be processed by SIP server 16 (Step S102). For example, SIP device information may include device identification information or data, for example primary terminal number (TN), secondary TN, client name, MAC address, among other device information that can be processed to determine the identification of SIP device 12.

The transmitted SIP INVITE message may be communicated through one or more SIP proxy servers 14 (Step S102). Specifically, SIP proxy servers 14 may provide routing of the SIP INVITE message through network 18 to SIP server 16. SIP proxy servers 14 may include routing tables indicating where to route the SIP INVITE message based on SIP message (packet) header information, device information, SIP device location and the like. For example, SIP proxy servers 14 may provide alternate path routing in case of a failure to an SIP server 16 and/or may route the SIP INVITE message based on SIP device location or time of day, as discussed in detail below. Also, SIP proxy servers 14 may route SIP INVITE message using other communications methods known in the art.

SIP server 16 may receive the SIP INVITE message via SIP proxy server 14 (Step S102). SIP server 16 may process the message to register SIP device 12 and determine the SIP device configuration. In particular, SIP server 16 includes database 34 which stores a registration table and configuration table containing SIP device registration and configuration data, respectively. For example, the SIP device registration information may include SIP device model number, device type information, location information, among other registration information. The SIP device configuration data may include keypad configuration, encoding, codecs, among other configuration data. In particular, the configuration data may correspond with some or all of the information in the processed SIP INVITE message. The registration and configuration tables allow SIP server 16 to search the tables and compare the SIP INVITE message information with the information in the registration and configuration tables in order to determine the appropriate configuration data to transmit to SIP device 12.

In particular, some or all of the SIP device information may correspond to specific SIP device configuration data. For example, a particular SIP device type may correspond to specific keypad configuration data. Also, the location information in the SIP INVITE message may correspond to certain configuration data stored in the configuration table. For example, a wireless SIP device user who is typically located at a home office may be visiting a corporate headquarters in which corporate headquarters does not give full SIP device functionality to visiting users. In such a case, the configuration data may be different than the configuration data provided when SIP device 12 is at the home office.

Continuing the example, the wireless SIP device 12 may transmit the SIP INVITE message via the corporate network that may be part of network 18. SIP server 16 may determine that based on the location information in the SIP INVITE message and the SIP device's previous registration with the home office, alternate configuration information providing limited functionality should be transmitted to the wireless SIP device 12. The alternate configuration data may include limited keypad functionality, which may limit wireless SIP device 12 from accessing certain SIP device features. However, the alternate configuration data may also enable wireless SIP device 12 to have similar features and keypad functionality as home office SIP devices, e.g., the same keypad buttons may be used to access voicemail. In other words, certain SIP device features and configurations may consume substantial corporate server resources; therefore, a visiting employee at the corporate office may be configured to use a minimum amount of server resources. Accordingly, SIP server 16 may determine the specific SIP device configuration based on received SIP INVITE message information. Also, messages to and from SIP device 12 and SIP server 16 may be routed through network 18 via one or more proxy servers as discussed below.

SIP server 16 may transmit a "200 OK" message in response to receiving and processing the SIP INVITE message (Step S104). In particular, the 200 OK message may include a registration indicator, configuration data, among other information. The registration indicator may indicate the result of the SIP device registration at SIP server 16. For example, the registration indicator may be one or more alphanumeric characters that indicate whether SIP device registration at SIP server 16 was successful. The configuration data in the 200 OK message may also include button functionality information, passwords, identification numbers, daytime/nighttime configurations, codecs, among other data that may be processed by SIP device 12. The button functionality information may indicate the function of each button on SIP device 12. For example, the button functionality information may indicate that pushing a programmable key on the SIP device 12 corresponds to the function of dialing voicemail. In other words, the button functionality information may indicate the function of each button or combination of buttons on SIP device 12. The button functionality information may dictate the behavior of all buttons including configurable, specialized, or keypad buttons. As such, the 200 OK message may contain SIP device configuration data, e.g., configuration file.

SIP device 12 processes the 200 OK message received from SIP server 16 via SIP proxy server 14 (Step S106). The registration indicator may indicate whether SIP device 12 was successfully registered with SIP server 16. For example, a "RegistrationResult" value of "0" may indicate the registration was successful or the value of "1" may indicate the registration was unsuccessful. In response to determining the registration was successful, SIP device 12 may update its configuration based on the processed configuration data. However, an unsuccessful registration may cause SIP device 12 to resend the SIP INVITE message, send a modified SIP INVITE message, notify the network administrator, and/or perform other actions. Continuing the example, a RegistrationResult value of "1" may cause SIP device 12 to send a modified SIP INVITE message to SIP server 16 or to alternate SIP server 16 in order to facilitate successful registration.

Also, an unsuccessful registration result may cause SIP server 16 to transmit alternate configuration data for configuring SIP device 12. An unsuccessful registration result based on received SIP INVITE message information may cause SIP server 16 to search for an alternate configuration. For example, the primary TN of the registering SIP device 12 may conflict with another registered SIP device. In this instance SIP server 16 may find an alternative Primary TN that does not conflict with the another registered SIP device. Also, SIP server 16 may indicate that an alternative configuration file is being transmitted by using a RegistrationResult value of "2" or a value different from a successful and unsuccessful registration result value. Accordingly, SIP server 16 may transmit an alternate configuration file to SIP device 12, thereby avoiding SIP device configuration conflicts.

SIP device 12 may transmit an acknowledgement (ACK) message to SIP server 16 in response to receiving the 200 OK message (Step S108). SIP device 12 may transmit the ACK message before the SIP device 12 processes the configuration data, e.g., in response to receiving a valid 200 OK message. Alternatively, SIP device 12 may process the configuration data before transmitting the ACK message to the SIP server 16, thereby allowing SIP device 12 to determine whether there is a problem with the configuration data before initiating conclusion of the SIP session through the transmission of a BYE message. For example, in response to determining there is a problem with the configuration data, SIP device 12 may resend the SIP INVITE message, send a modified SIP INVITE message, or do nothing, among other actions.

In response to receiving the ACK message via SIP proxy server 14 (Step S110), SIP server 16 may transmit a BYE message to SIP device 12 (Step S112). The BYE message may indicate that closing of the SIP session on the SIP server side. In response to receiving the BYE message from SIP server 16 via SIP proxy server 14 (Step S114), SIP device 12 may transmit the 200 OK message, thereby indicating that the BYE message was received by SIP device 12 (Step S116). The 200 OK message may be received by SIP server 16, thereby indicating the SIP session is closed (Step S118). While, the registration and configuration process of SIP device 12 uses "200 OK", BYE, ACK and SIP INVITE messages, other messages with substantially the same functionality may be used in accordance with the present invention. Accordingly, SIP device 12 may register and configure itself by using SIP messages to communicate with SIP server 16.

Furthermore, the use of multiple SIP servers 16 provides redundancy. In particular, the SIP INVITE message may be routed to any SIP server 16 for registration and configuration of SIP device 12. For example, if SIP server 16 at the home office is down, the SIP INVITE message may be routed to another SIP server 16 within the home office network or to another SIP server 16 outside the home office network, e.g., corporate office SIP server 16, that will register and transmit configuration data to SIP device 12. The down SIP server 16 may be updated once the server is back online, e.g., update registration information. Accordingly, SIP device 12 may be registered and configured even SIP servers 16 are malfunctioning.

Also, the use of SIP proxy servers 14 allows SIP messages to be routed through network 18 in order to reach an appropriate SIP server 16. Continuing the example, if the home office SIP server 16 is malfunctioning, SIP proxy servers 14 may route the SIP INVITE message to an alternate SIP server 16 within the home office network or outside of the home office network, both of which may be part of network 18. Furthermore, if registration and configuration with one SIP server 16 fails, SIP device 12 may resend the SIP INVITE message to an alternate SIP server 16. For example, the registration result in the 200 OK message may indicate that registration failed, so SIP server 16 or SIP proxy server 14 may forward any further SIP INVITE messages from corresponding SIP device 12 to another SIP server 16 through SIP proxy servers 14. Accordingly, SIP proxy servers 14 provide redundancy by routing and re-routing SIP messages through network 18.

An exemplary process for registering and configuring SIP device 12 is described with reference to FIG. 3. The SIP messages being transmitted and received may contain a payload in Extensible Markup Language (XML) format. For example, the registration and configuration data contained in the SIP INVITE message may be formatted in an XML format. Using an XML format provides a flexible program coding arrangement that can be updated by modifying line(s) of code. For example, the SIP INVITE message may contain a name element in XML format (<ClientName>name element</ClientName>). In other words, the SIP INVITE message may contain an XML file format that may be updated by adding or deleting a line of code. Continuing the example, the SIP INVITE message may be reformatted by the user or system administrator to include a Caller ID element (>CallerID>Caller ID element</CallerID>) (not shown). The Caller ID element may indicate the name that is associated with particular SIP device 12. Moreover, other elements may be added to or deleted from the XML payload of the message. Also, other file formats may be used in accordance with the present invention.

SIP device 12 may transmit an SIP INVITE message to SIP server 16 to initiate registration and configuration (Step S120). The SIP INVITE message includes information such as primary TN "100 0 1 0", secondary TN "100 0 1 1", Client IP "192.168.6.90", audio port "5200", codec list "1, 2, 3, 4", and client name "Avaya IP Attendant". In particular, primary and second TNs refer to the terminal numbers of SIP device 12 such that the terminal numbers are used to identify SIP device 12. The Client IP may refer to the IP address for SIP device 12. The audio port may indicate the logical transport port through which audio data is sent and received. The codec list may indicate the codec that are supported by SIP device 12 and/or order of codec preference. The client name may indicate the name of the manufacturer, business name and the like.

Figure 3:
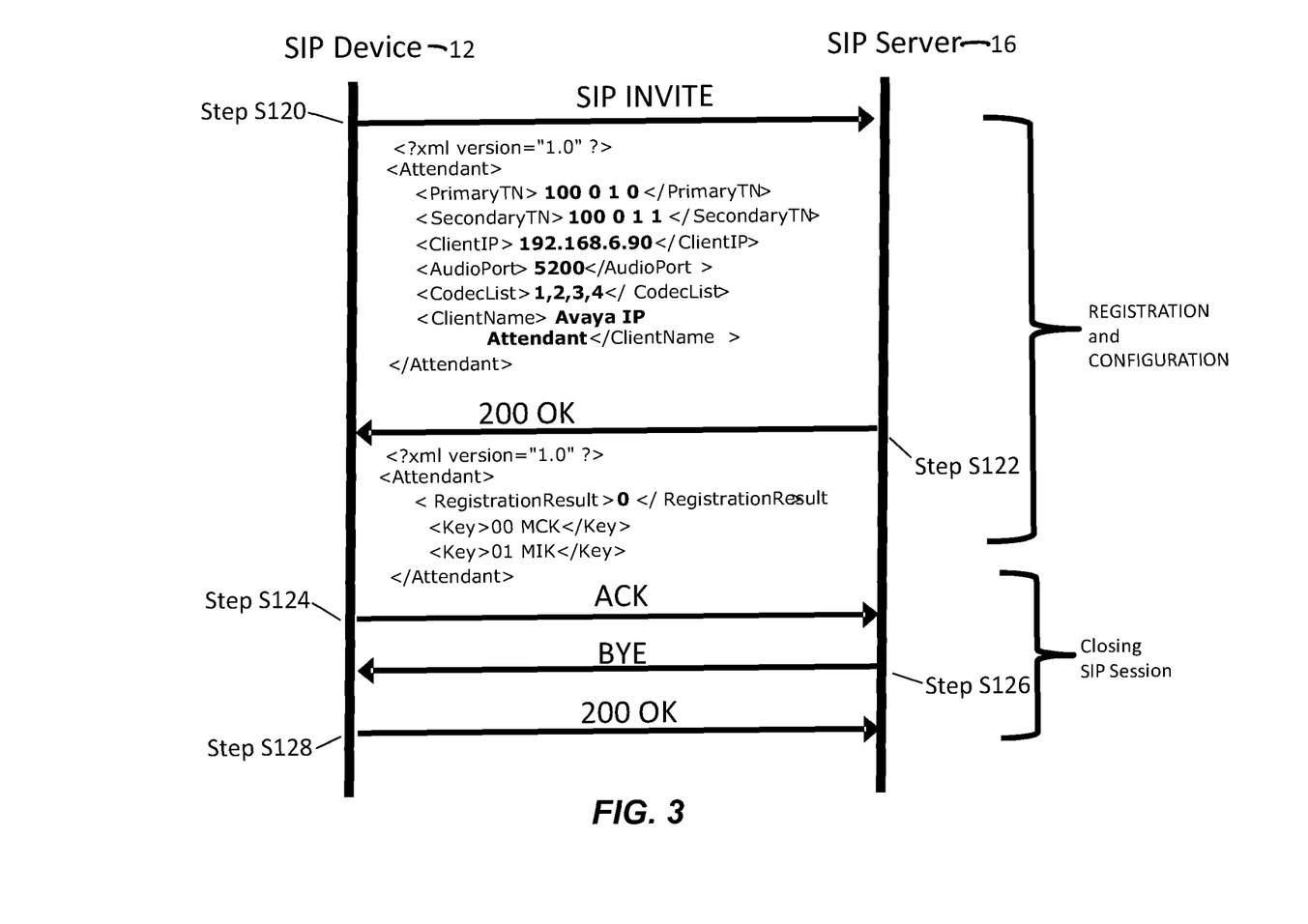
FIG. 3 is a flow chart of a specific example of an sip device registration and configuration process of the present invention.

While not shown in FIG. 3, the SIP INVITE message may be routed through one or more SIP proxy servers 14. After SIP server 16 receives the SIP INVITE message, SIP server 16 may process the message to determine the corresponding configuration data to transmit to SIP device 12, as discussed in detail with reference to FIG. 5. The configuration data may be transmitted within the 200 OK message payload to SIP device 12, in which the configuration data is formatted in an XML format (Step S122). In response to receiving the 200 OK message, SIP device 12 may transmit an ACK message confirming SIP device 12 was able to process the configuration data and update its configuration (Step S124), as discussed in detail with reference to FIG. 4. SIP server 16 may transmit a BYE message in response to receiving the ACK message from SIP device 12, thereby confirming closing the SIP session on the SIP server side (Step S126). In response, to receiving the BYE message, SIP device 12 may confirm the closing of the SIP session on SIP device 12 side by transmitting the 200 OK message to the SIP server 16 (Step S128).

Figure 4:
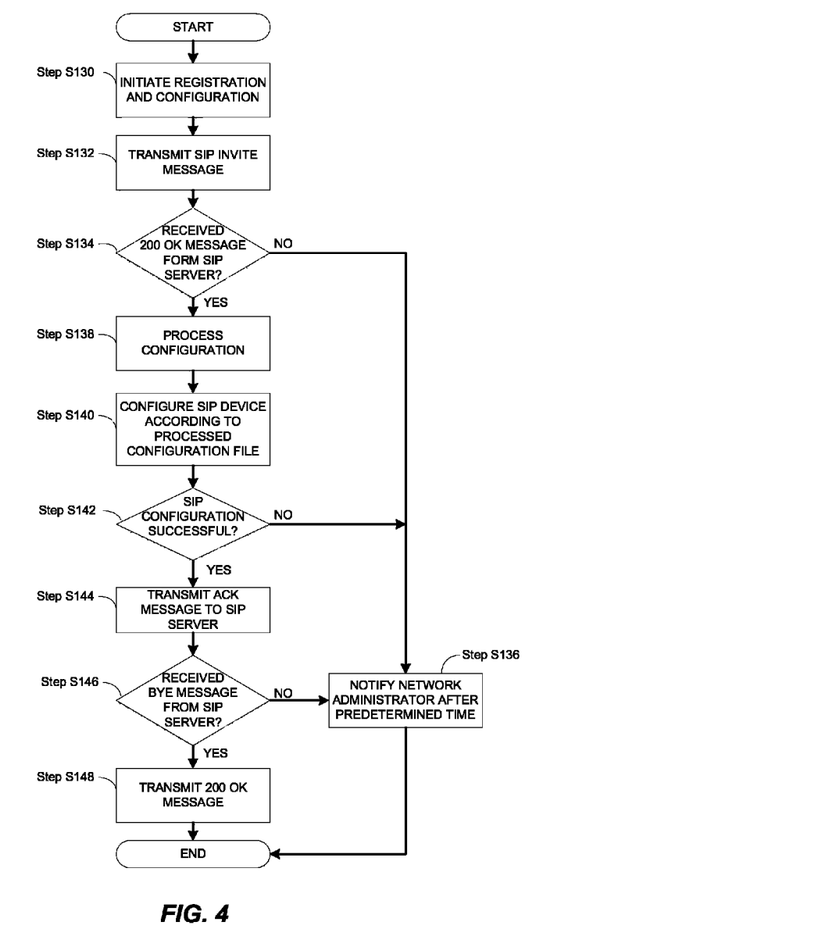
FIG. 4 is a flowchart of an exemplary SIP device registration and configuration process at the SIP device.

An exemplary SIP device registration and configuration process at SIP device 12 is described with reference to FIG. 4. SIP device 12 may initiate the registration and configuration process upon the occurrence of an event (Step S130). The event may be SIP device 12 power up, pushing a particular SIP device button, SIP device detection of network 18, among other events. The initiation event may trigger SIP device 12 to transmit the SIP INVITE message to SIP server 16 (Step S132). The SIP INVITE message may include XML formatted SIP device information such that SIP server 16 may determine the corresponding configuration data as discussed in detail with reference to FIG. 5. SIP device 12 determines whether the 200 OK message has been received from SIP server 16 (Step S134). In particular, SIP device 12 may periodically or continuously check whether the message has been received. A count up or countdown timer may be used to limit the amount of time SIP device 12 uses to check whether the message was received. For example, a network administrator may be notified of the registration and configuration problem if the 200 OK message is not received after a predetermined time, e.g., before the timer expires (Step S136).

However, if the 200 OK message is received from SIP server 16 within a predetermined time, SIP device 12 may process the 200 OK message, e.g., process the configuration data (Step S138). In particular, processing 200 OK message may include processing the SIP message (data packet message) by processing methods known in the art. SIP device 12 may update its device configuration in accordance with the processed configuration file (Step S140). For example, SIP device 12 may update its keypad configuration, features associated with certain device keys, among other SIP device configurations and features.

SIP device 12 may use a diagnostic routine to verify the configuration was successful (Step S142). For example, the diagnostic routine may check SIP device 12 has basic functionality such as keypad configuration, network connectivity, among other basic device functionality. The diagnostic routine may be a set of program instructions stored on device memory that when executed by a computer processor causes the processor to perform the instructions. As such, SIP device 12 may determine whether the SIP configuration process was successful. If the configuration was not successful, the network administrator may be notified (Step S136). Also, the network administrator may determine what constitutes a "successful" configuration, e.g., may configure SIP server 16 transmit 200 OK message that includes a criteria to modify the diagnostic routine to change the minimum features or device functionality that constitutes a "successful" configuration. For example, SIP device 12 may only be able to update its keypad functionality and network connection, in which these two features have been predetermined to constitute a successful configuration.

If the SIP configuration is successful, SIP device 12 may transmit an ACK message to SIP server 16 (Step S144). The transmission of the ACK message indicates SIP device 12 is initiating closure of the SIP session, e.g., SIP device configuration was successful and should be closed. SIP device 12 may start a timer sequence for a predetermined amount of time in response to the transmission of the ACK message. In particular, SIP device 12 determines whether a BYE message is received from SIP server 16 within the predetermined amount of time (Step S146). If no BYE message is received within the predetermined time, the network administrator may be notified of the problem (Step S136). SIP device 12 may transmit the 200 OK message in response to receiving the BYE message from SIP server 16 within the predetermined time (Step S148). The 200 OK message indicates SIP device 12 acknowledges the SIP session that configured SIP device 12 is now closed.

Figure 5:
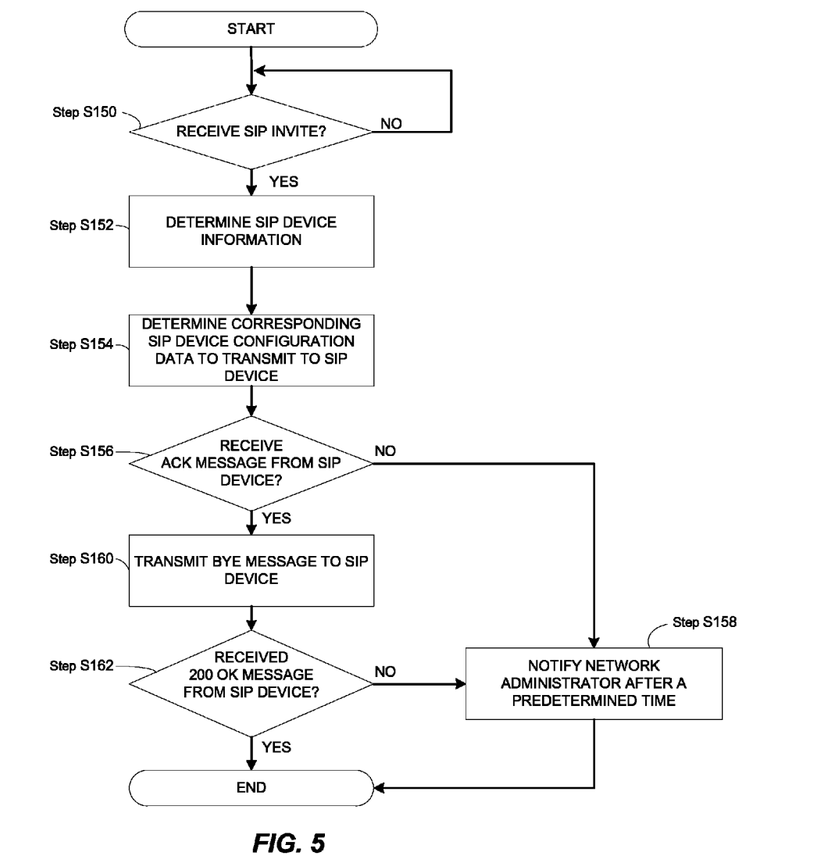
FIG. 5 is a flowchart of an exemplary SIP device registration and configuration process at the SIP server.

An exemplary process for registration and configuration of SIP device 12 at SIP server 16 is described with reference to FIG. 5. SIP server 16 determines whether an SIP INVITE message has been received via network 18 (Step S150). If no SIP INVITE message is received by SIP server 16, the server continues to check whether a message is received (Step S150). If an SIP INVITE message is determined to have been received at SIP server 16, the server processes the SIP INVITE message. In particular, SIP server 16 processes the message via data packet processing techniques known in the art to determine the SIP device information in the SIP INVITE message (Step S152). For example, SIP server 16 may process the SIP INVITE message to determine SIP device information such as Client IP, Primary TN, model number, SIP device location, among other information that may be included in the XML payload of the SIP INVITE message.

SIP server 16 uses the processed SIP INVITE message information to determine the particular configuration data to transmit to SIP device 12 (Step S154). For example, SIP server 16 may determine that certain configuration data corresponds to the SIP device model number, so at least this specific configuration data will be transmitted to SIP device 12. Also, SIP server 16 may determine that one or more information elements in the processed SIP INVITE message indicate SIP device 12 is temporarily located in a new location. In other words, an employee from a remote or branch office may be visiting corporate headquarters using wireless SIP device 12 in which the SIP devices of visiting employees are typically given limited functionality on the corporate network. For example, SIP server 16 may use the primary TN and device location to determine SIP device 12 corresponds to a visiting employee. As such SIP server 16 may transmit configuration data to SIP device 12 having limited features, e.g., limited bandwidth usage, no conference calling, among other wireless SIP device features.

Alternatively, SIP server 16 may store default configuration data based on SIP device model number and/or other SIP device information. For example, SIP server 16 may transmit substantially the same configuration data to all landline-based SIP devices, e.g., substantially the same keypad configuration, voicemail features, conference calling feature, among other SIP device features. Accordingly, the particular configuration data transmitted to SIP device 12 is based on the processed SIP INVITE message.

After SIP server 16 transmits the configuration data to SIP device 12, the server determines whether an ACK message is received from SIP device 12 (Step S156). In particular, SIP server 16 may initiate a timer in response to the transmission of the 200 OK message to determine whether the ACK message is received within a predetermined time. For example, SIP server 16 may start a countdown timer in which the server will determine whether the ACK message is received within before the timer ends. If the ACK message is not received within a predetermined time, a network administrator may be notified (Step S158). However, if the ACK message is received within a predetermined time, SIP server 16 may transmit a BYE message indicating that SIP server 16 closing the SIP session (Step S160), e.g., SIP device 12 is configured so SIP server 16 may close the SIP session.

SIP server 16 may determine whether the 200 OK message is received from SIP device 12 within a predetermined time (Step S162). For example, SIP server 16 may start a countdown timer in which the server will determine whether the 200 OK message is received before the timer ends. If the 200 OK message is determined not to have been received within the predetermined time, SIP server 16 may notify the network administer of the problem (Step S158). If the 200 OK message is determined to have been received within the predetermined time, SIP server 16 may reset all timers and check if another SIP device is initiating registration and configuration via another SIP INVITE message, e.g., SIP session is closed. Alternatively, SIP server 16 may continue to configuration process when no ACK and/or 200 OK messages are received from SIP device 12 within a predetermined time. For example, SIP server 16 may transmit a BYE message to SIP device 12 and notify the network administer of a problem if no ACK message is received from SIP device 12 within a predetermined time. In other words, SIP server 16 may continue the SIP device configuration process in the absence of receiving any further messages from SIP device 12. For example, the user may mistakenly unplug the network or phone cable from the SIP device 12 after the SIP session begins. Accordingly, SIP server 16 may register and configure SIP device 12 for use in a VoIP network.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for configuring a Session Initiation Protocol (SIP) device, the system comprising:
    at least one SIP server in communication with the SIP device over an Internet Protocol (IP) network, the at least one SIP server having:
        a database configured to store SIP device configuration data;
        a receiver configured to receive a first SIP INVITE message having a configuration request message to initiate SIP device configuration, the first SIP INVITE message including a uniform resource identifier (URI) identifying one of the at least one SIP server;

a transmitter configured to transmit configuration data to the SIP device in response to receiving the first SIP INVITE message, the SIP device configuration data being in an Extensible Markup Language (XML) format and specifying functionality of the SIP device based on at least one of device location and device identification; and the receiver configured to receive a second message from the SIP device indicating whether the SIP device was successfully configured based on the configuration data.

2. The system of claim 1, further comprising at least one SIP proxy server configured to route the first SIP INVITE message to the identified one of the at least one SIP server.

3. The system of claim 2, wherein the at least one SIP server includes a primary SIP server and an alternate SIP server, the first SIP INVITE message being routed by the at least one SIP proxy server to the alternate SIP server when the primary SIP server is unavailable.

4. The system of claim 3, wherein the at least one proxy server includes a plurality of SIP proxy servers, the first SIP INVITE message being routed through the plurality of SIP proxy servers.

5. The system of claim 1, wherein the transmitted configuration data is based in part on time of day.

6. The system of claim 1, further comprising transmitting modified configuration data in response to determining the second message indicates the SIP device is not successfully configured.

7. The system of claim 1, wherein the first SIP INVITE message includes at least one identification element corresponding to the SIP device.

8. The system of claim 7, wherein the at least one identification element includes one of a client IP address, primary Terminal Number (TN) and secondary TN.

9. The system of claim 7, wherein the transmitted configuration data includes one of a phone key functionality data and at least one SIP device feature.

10. A Session Initiating Protocol (SIP) device, the device comprising:
a transmitter configured to transmit a configuration request message in an SIP INVITE message that includes a uniform resource identifier (URI) identifying an SIP server, the configuration request message initiating an SIP session;
a receiver configured to receive an SIP configuration message from the identified SIP server, the SIP configuration message including SIP device configuration data, the SIP device configuration data being in an Extensible Markup Language (XML) and specifying functionality of the device based on at least one of device location and device identification;
a processor in communication with the transmitter and receiver, the processor configured to:
process the SIP device configuration data, the processor initiating SIP device configuration based on processed SIP device configuration data; and
determine whether configuration is successful.

11. The SIP device of claim 10, wherein the transmitter is configured to transmit an acknowledgement message indicating whether a configuration is successful.

12. The SIP device of claim 11, wherein transmitting the acknowledgement message precedes closure of the SIP session.

13. The SIP device of claim 10, wherein the SIP device configuration data is based in part on at least one identification element corresponding to the SIP device.

14. A method for configuring a Session Initiation Protocol (SIP) device, the method comprising:
storing SIP device configuration data;
receiving an SIP device configuration message in an SIP INVITE message that includes a uniform resource identifier (URI) identifying an SIP server that stores the SIP device configuration data;
establishing via the identified SIP server, an SIP session in response to the received configuration message; and
transmitting SIP device configuration data from the identified SIP server to an SIP device in response to establishing the SIP session, the SIP device configuration data being in an Extensible Markup Language (XML) and specifying functionality of the device based on at least one of device location and device identification.

15. The method of claim 14, wherein the SIP device configuration message includes identification data corresponding to the SIP device, the SIP device configuration data corresponding to the identification data.

16. The system of claim 1, wherein the SIP server compares configuration information contained in the first SIP INVITE message to configuration data stored in the database in order to determine the transmitted configuration data.

17. The SIP device of claim 10, wherein the transmitted configuration request message includes configuration information for comparison to configuration data stored at an SIP server that receives the transmitted configuration request message.

18. The SIP device of claim 10, wherein the SIP device further periodically checks whether an OK message has been received within a specified period of time.

19. The SIP device of claim 18, wherein an administrator is notified of a configuration problem if the OK message has not been received within the specified time.

* * * * *